No. 694,349. Patented Mar. 4, 1902.
H. R. CASSEL.
PROCESS OF RECOVERING GOLD FROM REFRACTORY ORES.
(Application filed June 12, 1901.)
(No Model.)
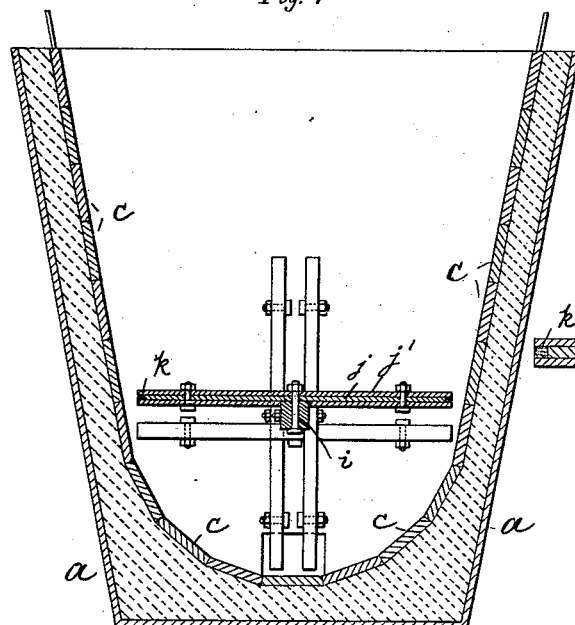
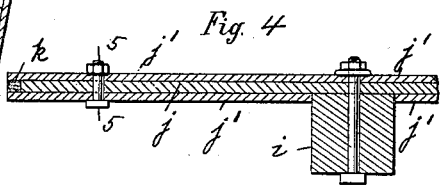
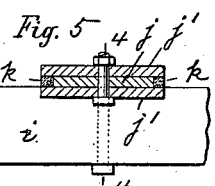
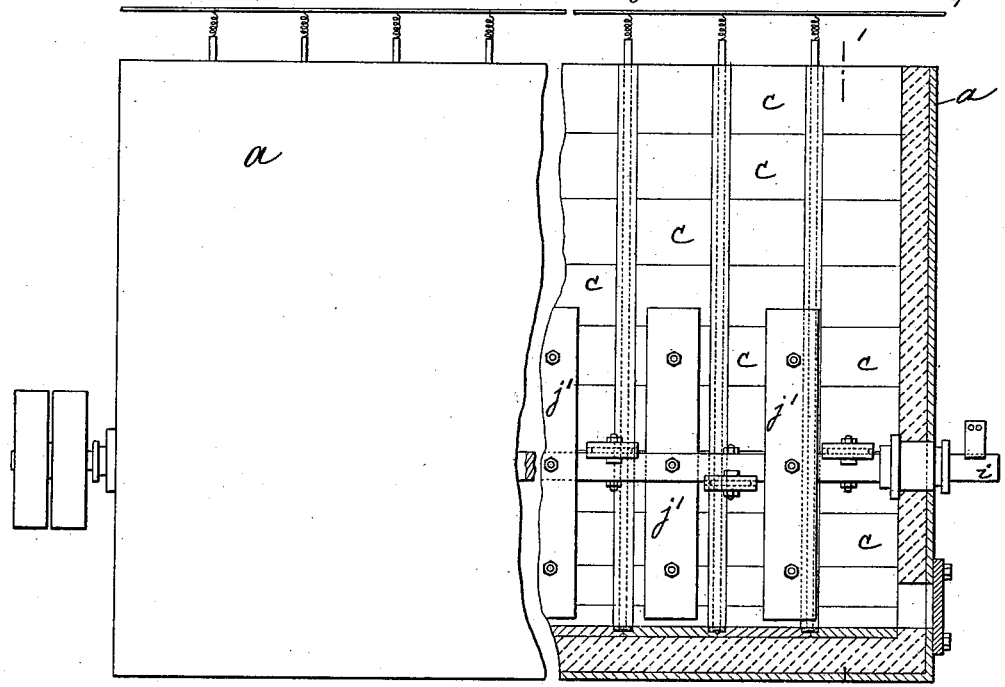
Witnesses:
William Schulz
Eugène Guérin
Inventor:
Henry R. Cassel
by Roeder & Bresen Att'ys.

UNITED STATES PATENT OFFICE.

HENRY R. CASSEL, OF NEW YORK, N. Y.

PROCESS OF RECOVERING GOLD FROM REFRACTORY ORES.

SPECIFICATION forming part of Letters Patent No. 694,349, dated March 4, 1902.

Application filed June 12, 1901. Serial No. 64,198. (No specimens.)

*To all whom it may concern:*

Be it known that I, HENRY R. CASSEL, a citizen of the United States, and a resident of New York city, county and State of New York, have invented certain new and useful Improvements in Processes of Recovering Gold from Refractory Ores, of which the following is a specification.

The object of my invention is to provide easy means for recovering gold from refractory ores, such as tellurides, sulfids, or other compounds containing them.

It is well known that at present tellurides or sulfids containing gold must be roasted in order to oxidize the tellurium or sulfur, and thereby set free the gold, which can then be chemically treated; but roasting involves cumbersome machinery and loss of gold. To dispense with the former and obviate the latter has long been the aim of metallurgists, so far, however, without success. Hitherto gold in combination with refractory elements has not been soluble except by acids, the employment of which is prohibitive. In other words, its solution by that means has been impracticable.

I have found an easy, cheap, and entirely practicable method of treating refractory ore and substances and dissolving the gold contained therein by rendering the same easily soluble without previous roasting, thereby avoiding the losses attendant on roasting and rendering it possible to treat vast quantities of low-grade ores hitherto unproductive, and thus stimulating the mining industry as a whole. By my novel system the gold is readily and actually dissolved and recovered. The method is simple, practical, and, most important of all, it can be applied on the most extensive scale and can be carried out easily. Moreover, the apparatus involved is of simple construction, requiring a minimum of repairs, while the process is sufficiently cheap to admit of the treatment of those low-grade ores that up to the present have not been treated for want of a suitable method.

My system is far in advance of any known electrolytic process, as it enables any desired quantity of refractory ore to be treated without roasting. Cylinders, for instance, have only a limited capacity, are cumbersome in construction, the interior is not readily accessible, repairs are frequent and costly, the electrodes are not easily applied, are difficult to introduce, their insulation is difficult to maintain, leakage is unavoidable, and generally they are the cause of disorder and stoppage; nor do cylinders admit of a thorough mixture of the ore and water into a pulp, the ore being liable to cake and pack to the sides of the drum, especially when unoxidized and of a clayey nature.

The accompanying drawing represents an apparatus by means of which my process can be carried out.

Figure 1 is a vertical transverse section of the apparatus on line 1 1, Fig. 2. Fig. 2 is a side elevation, partly broken away, of the same; Fig. 3, a transverse section of two adjoining lining-plates $c$; Fig. 4, a detail cross-section through the shaft $i$ on line 4 4, Fig. 5; and Fig. 5 a section on line 5 5, Fig. 4.

In my process the finely-pulverized ore is treated electrolytically with a suitable electrolyte—for instance, chlorid of sodium in solution, to which, if desired, oxidizing-salts may be added. The ores are first converted into a pulp by the admixture of water containing sufficient salt to render it conductive, about three per cent. generally being ample. This pulp, now composed of ore and salt water, is then agitated in an open vessel $a$, described in an application for a patent filed by me on even date herewith under serial number 64,199 and to which reference is hereby made. The sides of this vessel are lined with carbon or other conductive material $c$ not affected by the electric current, while within the vessel are contained mixing-stirrers affixed or fitted to a properly-insulated shaft $i$. These stirrers are preferably composed of metal blades $j$ of suitable dimensions covered with carbon plates $j'$, the interstices being filled with cement $k$, so as to leave no free metallic surface to be affected by electrolytic action. The metal blades and the carbons covering them must be connected in such a manner with the shaft that the electric current passes readily from the shaft through the blades to the carbon plates. In some instances the mixing-stirrers may be of wood, while rods or strips of carbon or other suitable conductive material are suspended in the pulp. The carbon lining and stirrers are connected with a dynamo (the stirrers through the shaft) and form respective electrodes, of which the polarity can be reversed at will. The pulp is charged into this apparatus while the stirrers are revolved, so as to keep the mass in thorough agitation. Simultaneously the electric current is switched on, decomposing the chlorid of sodium and forming substances at the anode, such as hypochlorites and oxychlorids, until the tellurium, sulfur, or other refractory elements in the pulp are sufficiently oxidized and the gold is set free and dissolved. This gold and the oxids of the alkaline earth metals always present in the ore are precipitated upon the negative pole in the form of a black powder, some of which will be immediately scoured off and scattered in the pulp by the action of the stirrers, the remainder being occluded and retained on the plates by the other precipitates. The black precipitate of gold now being readily soluble, I add a suitable solvent, such as cyanid of potassium, to the pulp, the mass being kept thoroughly agitated. In this way I readily redissolve the finely-divided gold, which when in solution can be separated from the pulp either by decantation, filter-pressing, or any other means and, lastly, precipitated for final recovery in the ordinary way. On adding the cyanid the current may be stopped. As the gold when intermingled with other precipitates at times tenaciously clings to the cathodes, the mere addition of cyanid of potassium to the pulp is not always productive of the desired effect, besides which the precipitate if not removed forms a thick non-conductive layer upon the electrodes that very materially increases the resistance and necessitates the use of a stronger current. It is therefore essential in such cases to prevent the formation of such precipitates on the electrodes, which I effect by reversing the current from time to time, thus changing the polarity and causing the precipitates to detach and redissolve. In this way little or no precipitate will remain on the electrodes, and the gold will be kept in the pulp. The cyanid of potassium serves to dissolve the gold which is contained in the pulp in a fine state of division and which is therefore easily soluble by the solvent. By keeping the pulp thoroughly agitated and reversing the current every particle of metal between the electrodes becomes polarized, assuming a − and a + polarity. Were these particles quiescent the solution of the coarser globules of gold would be very slow; but inasmuch as by the agitation of the pulp the particles are continually changing position it follows that the deposit on the − side is instantly scoured off, while on the + side the metal itself is dissolved. A double-dissolving action is thus obtained, whereby the solution of the gold is greatly accelerated.

The above-described process will transform the gold into an easily-soluble condition in a simple and practical manner, the quantities under treatment depending, of course, upon the size of the apparatus employed.

What I claim is—

1. The process of recovering gold from refractory ores which consists in converting the ore into a pulp, adding a salt capable of yielding by electrolysis oxidizing and dissolving agents, agitating the mixture and simultaneously electrolyzing it under such conditions as to oxidize the refractory elements, dissolve the gold and reprecipitate the dissolved gold in the form of a black powder, and finally adding a solvent to redissolve such black powder, substantially as specified.

2. The process of recovering gold from refractory ores which consists in converting the ore into a pulp, adding a salt capable of yielding by electrolysis oxidizing and dissolving agents, agitating the mixture and simultaneously electrolyzing it under such conditions as to oxidize the refractory elements, dissolve the gold and reprecipitate the dissolved gold in the form of a black powder, reversing the current to detach the black powder from the electrodes, and finally adding a solvent to redissolve such black powder, substantially as specified.

Signed by me at New York city, county and State of New York, this 10th day of June, 1901.

HENRY R. CASSEL.

Witnesses:
WILLIAM SCHULZ,
F. v. BRIESEN.